July 7, 1964 T. A. WEIL 3,140,439

MAGNETIC AMPLIFIER CONTROLLED VOLTAGE REGULATING CIRCUIT

Filed May 16, 1961 2 Sheets-Sheet 1

INVENTOR.
THOMAS A. WEIL

BY
Kenway, Jenney & Hildreth

ATTORNEYS

July 7, 1964 T. A. WEIL 3,140,439

MAGNETIC AMPLIFIER CONTROLLED VOLTAGE REGULATING CIRCUIT

Filed May 16, 1961 2 Sheets-Sheet 2

INVENTOR.
THOMAS A. WEIL
BY
Kenway, Jenney & Hildreth
ATTORNEYS

United States Patent Office 3,140,439

Patented July 7, 1964

3,140,439

MAGNETIC AMPLIFIER CONTROLLED VOLTAGE REGULATING CIRCUIT

Thomas A. Weil, Wellesley Hills, Mass., assignor to Atlas Engineering Co., Inc., Roxbury, Mass., a corporation of Massachusetts Filed May 16, 1961, Ser. No. 110,375
9 Claims. (Cl. 323—89)

This invention relates generally to voltage regulating apparatus and more particularly it is concerned with alternating voltage regulators incorporating magnetic amplifiers.

As is well known to those skilled in the art, voltage regulators are generally classifiable as either open loop or closed loop types depending upon whether or not they incorporate some form of voltage control medium which responds to error signals derived from the load voltage. Closed loop type regulators offer a number of advantages chief among which is the ability to provide more precise regulation of a load voltage and to accommodate wider variations in the size and character of the load and the value and frequency of the voltage source. Although they are not unaffected by variations in frequency and power factor, regulators of this type are nevertheless capable of providing compensation for these effects by virtue of the fact that the load voltage is controlled as a function of the error signals. A disadvantage of closed loop type regulators, however, is that they tend to be more complex in that they require implementation of the several functions of deriving error signals, amplifying the error signals, and varying the load voltage in response to the error signals. Furthermore, because of the time delays inherent in deriving the error signals and responding to them, closed loop type regulators cannot generally respond as fast as open loop regulators. To minimize complexity, magnetic amplifiers have been used extensively for amplification and control and to minimize response time, special magnetic amplifier circuits have been devised which provide fast open loop response together with accurate closed loop control.

For example, in application No. 48,884, filed August 11, 1960, in the name of James M. Spinks, there is disclosed a voltage regulator incorporating a magnetic amplifier and associated circuitry which makes use of passive circuit elements, exclusively. A feature of the regulator disclosed in the Spinks application, in addition to its inherent simplicity, fast response, and virtually indefinite service life, is that harmonic distortion of the output voltage is maintained at a very low value. In an increasing number of applications for voltage regulators this feature is not only desirable but required by the nature of the load to be served. Another example of a voltage regulator which incorporates a magnetic amplifier and which is adapted to provide fast response and an output voltage relatively free of distortion causing harmonics, is to be found in my co-pending application No. 92,299, filed February 28, 1961. In the regulator design disclosed in my co-pending application, the magnetic amplifier is adapted to perform in addition to its amplification and voltage control functions, the function of transforming the impedance of certain circuit elements. In this way, a simplification is accomplished which makes possible savings in weight and size of the unit as well as in its cost.

The present invention contemplates another approach to the realization of a more simplified design of regulator which provides fast open loop response and accurate closed loop control. The regulator of the present invention is characterized by the use of a magnetic amplifier in combination with a saturating transformer in which the functions of impedance transformation and voltage control are merged. In effect, the saturation level of this transformer is controlled by the magnetic amplifier which in this case can be embodied in a much smaller unit. To accomplish this result, the regulator of the present invention incorporates, in addition to the saturating transformer, a non-saturating transformer provided with the same number of windings or portions thereof as are provided on the saturating transformer core. Also the turns ratios of the windings of the non-saturating and saturating transformers bear a predetermined relation to one another as will appear. One of these non-saturating transformer windings is connected in series with the input circuit of the saturating transformer. Another is connected to the magentic amplifier. In an optional version of the regulator, the non-saturating transformer has still a third winding which is connected in series with an input winding on the saturating transformer.

The object of the present invention, therefore is to reduce the size and weight of voltage regulators of the above-mentioned character.

A concomitant object is to reduce their cost.

Still another object is to provide a regulator which is highly effective in stabilizing the load voltage without increasing harmonic distortion significantly.

The novel features of the present invention together with further objects and advantages will become apparent from the following detailed description and the drawing to which it refers. In the drawing.

Figures 1, 2:
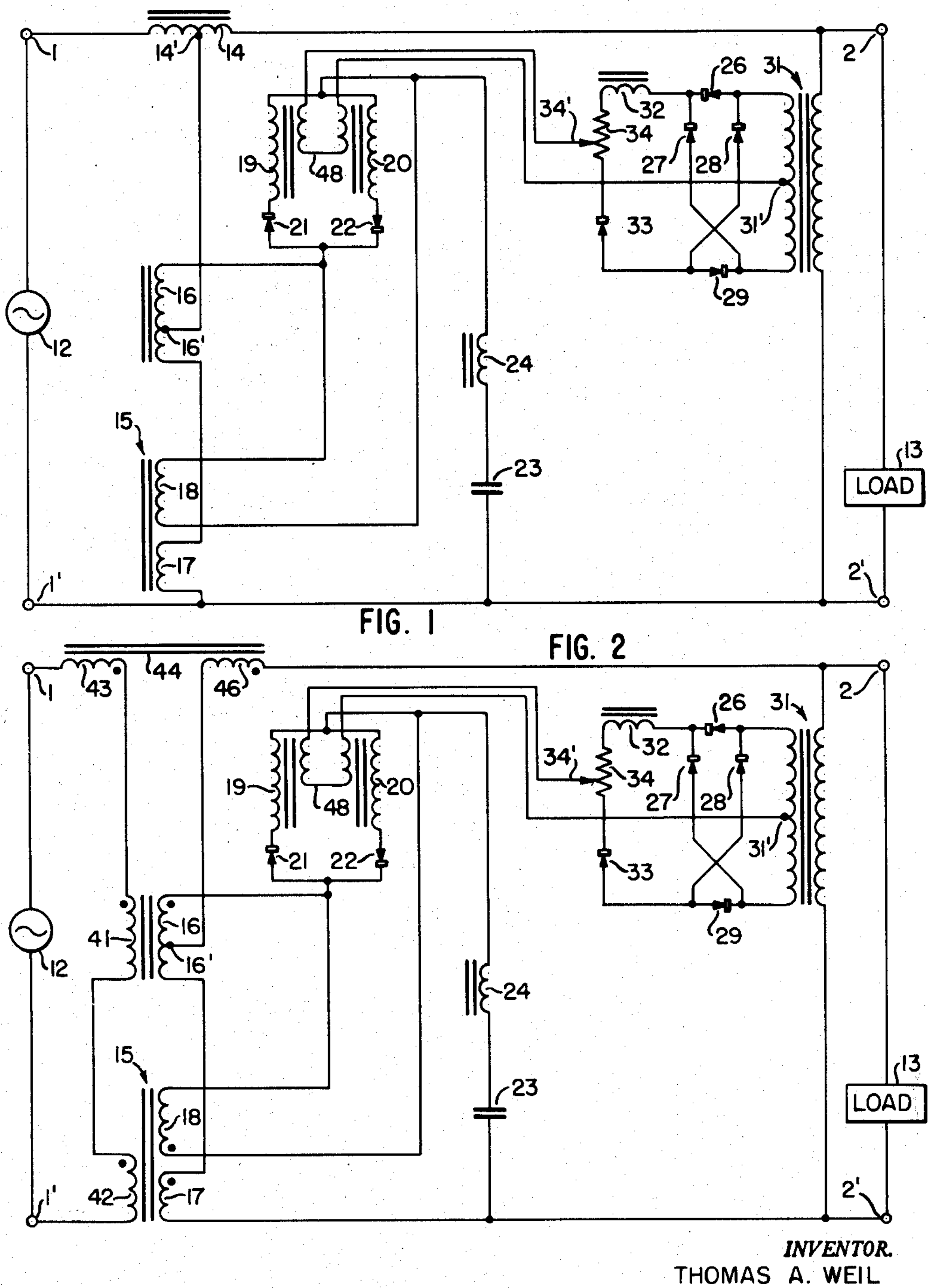
FIG. 1 is a schematic diagram of the most basic embodiment of the invention.
FIG. 2 is a schematic diagram of a more refined version of the embodiment of FIG. 1.

With reference first to FIG. 1 it will be observed that the numerals 1, 1' designate the input terminals of the voltage regulator and the numerals 2, 2' designate the output terminals. A source 12 of alternating voltage to be regulated is connected to the terminals 1, 1', and a load 13 to be served by the regulated voltage is connected to the terminals 2, 2'. Coupled between the terminals 1 and 2 is a linear reactor 14 having a tap 14'. Tap 14' is connected to a tap 16' on the winding of a saturating autotransformer 16. The portion of the winding 16 between tap 16' and the lower winding end comprises the input circuit to the autotransformer and is connected to common terminals 1', 2', through a winding 17 associated with a non-saturating transformer 15. A second winding 18 on the core of transformer 15 is connected to the load winding circuits of a magnetic amplifier. Windings 17 and 18 have the same turns ratio as the lower and upper winding portions of winding 16, respectively, as are defined by the tap 16'.

The magnetic amplifier is seen to have a pair of load windings 19 and 20 and in circuit with the respective load windings are a pair of oppositely poled diodes 21 and 22. The parallel combination of the load winding circuits is connected, in series with a reactive circuit, between the remaining portion of the autotransformer winding and the common terminals 1', 2'. The reactive circuit is formed with an inductor 24 and a capacitor 23 connected in series with one another.

The control windings of the magnetic amplifier are designated 48 and are provided with a direct current whose magnitude is determined by the magnitude of the load voltage. To this end, there is provided a transformer 31 with its primary winding connected to the output terminals 2, 2' and its secondary winding connected to a rectifier circuit including diodes 26–29. Diodes 26 and 28 have their positive and negative electrodes, respectively, connected to one end of the secondary winding and diodes 27 and 29 have their respective positive and negative electrodes coupled to the opposite end of this secondary winding. The negative electrodes of the diodes 26 and 27 are connected to one end of a choke while the positive electrodes of diodes 28 and 29 are connected to a Zener diode 33. A potentiometer 34 is connected between the Zener diode 33 and the choke 32, the voltage for the magnetic amplifier control winding being taken across the movable arm 34′ of the potentiometer and a center tap 31′ on the transformer secondary.

In operation under full load conditions, approximately, the net reactance of the circuit including choke 24 and capacitor 23 resonates in parallel with the combined reactances of the windings 16, 17, 19 and 20. Off resonance, the load voltage can be either greater or less than the source voltage depending upon whether the net impedance of the parallel resonant circuit coupled in parallel with the load by the autotransformer is capacitive or inductive.

For example, let it be assumed that a tendency exists for the load voltage to decrease. A decrease in load voltage is reflected in a corresponding decrease in the direct voltage applied by the rectifier circuit to the series combination of the potentiometer 34 and the Zener diode 33. The voltage across the Zener diode itself remains substantially constant, however. By proper choice of the characteristics of the diode relative to the value of the potentiometer, this constant voltage reference is made to exceed the voltage developed across the potentiometer, or at least the voltage between tap 34′ and the anodes of diodes 28 and 29 is made to exceed the voltage between tap 34′ and choke 32. It follows that the voltage between arm 34′ and tap 31′, the voltage which is applied to the magnetic amplifier control winding, increases with decreasing load voltage.

In the absence of any voltage on the control winding, the magnetic amplifier load windings 19 and 20 are adapted to maintain their associated cores in a saturated condition for most of each alternating half cycle of current which is permitted to flow by diodes 21, 22. The senses of control windings 48, however, are such that when current is caused to flow through them they oppose the magnetizing forces produced by the load windings, which tends to increase the saturation voltage, that is the amount of voltage on the load windings which produces saturation. An increase in control winding voltage and current such as results from a decrease in load voltage causes the inductive reactances of the magnetic amplifier load windings to increase.

When the inductive reactances of the magnetic amplifier load windings increase, the net current drawn by the branch circuit between tap 14′ and terminals 1′, 2′ becomes less inductive or more capacitive depending upon the value of saturation voltage that existed before the tendency arose for the load voltage to decrease. In the one case the absolute value of current in the circuit tends to decrease, and in the other case it tends to increase but in either case because of the inductance of reactor 14, the effect is to increase the voltage acros the circuit and thereby counteract the initial tendency of the load voltage to decrease.

Due to the impedance transforming action of the autotransformer 16, the impedance of the reactive circuit including inductor 24 and capacitor 23, as viewed from the input terminals 1, 1′, is made to appear lower than it actually is. With a low impedance level at this point it becomes possible to use a capacitor 23 with a higher voltage and lower current rating than would be the case otherwise. Such a capacitor can be made considerably smaller and less expensively than a higher current type of a capacitor with the same volt-ampere rating. Nor is this function of the autotransformer in any way affected by a change in the inductive reactance of the magnetic amplifier load windings. For example, should their reactance increase as previously postulated, this increase is reflected in the input circuit of the autotransformer by the transformer 15 and because the turns ratio of transformer 15 is equivalent to that of the autotransformer 16 the same impedance transformation is made by the former as by the latter. This compensates for the fact that the load windings are directly connected in the output circuit of the autotransformer where they would otherwise have a disproportionate effect upon the output circuit current as compared with the input circuit current. With transformer 15 coupled between the input circuit and the load windings, however, the effect is as if the cross section dimensions of the autotransformer core were subject to control in accordance with the saturation level of the magnetic amplifier.

The function of the reactor 24 is to minimize harmonic distortion. To this end, the inductor and capacitor are adapted to resonate in series with one another at the third harmonic of the operating frequency. This provides a low impedance path by means of which third harmonic current is shunted away from the load. The reason that the reactor circuit is preferably tuned to the third harmonic is that the third is by far the largest of the harmonic components that are present.

The function of the winding portion of reactor 14 through which only the load current flows is to provide better compensation for short term fluctuations in the source voltage or the load. Those skilled in the art will recognize, however, that this is not an essential feature of the voltage regulator according to the invention and that an untapped reactor unit can be employed where short term voltage stability is not so important.

In FIG. 2 there is illustrated a slightly more elaborate embodiment of the invention which affords D.C. isolation between input and output terminals. As is apparent from the scheme of reference numerals applied to FIG. 2, the distinguishing features of this embodiment are the association of a second winding 41 with the autotransformer and a third winding 42 on the non-saturating transformer 15. Windings 41 and 42 are seen to be series connected in circuit between the input terminals 1, 1′. Included in the circuit is a winding 43 on a core 44. Another winding 46 on this core is disposed in the line leading from the tap 16′ to the output terminal 2. Windings 43 and 46 function in like manner as reactor 14 in FIG. 1, D.C. separation of adjacent ends of the windings being made necessary to preserve the isolation between input and output terminals which the added coupling windings 41 and 42 afford.

In operation, changes in the impedance level of the magnetic amplifier load circuits are reflected in the input coupling circuit by means of the added winding 42 on the transformer 15. The number of turns in this added winding is related to those of the windings 17 and 18 in like manner as the turns on the coupling winding 41 are related to the portions of the winding 16 defined by the tap 16′. In this way, the object in view of reflecting the load winding reactances into the saturating transformer winding circuits as a function of the number of turns therein, is extended to take account of the coupling winding 41 required for isolation. The net effect is as before, namely control of the saturation voltage of the autotransformer in accordance with that of the magnetic amplifier, thereby to control the magnitude and phase of the current in the resonant or near resonant circuit branch including the saturating transformer and the magnetic amplifier which determines the magnitude of the load voltage.

Figure 3:
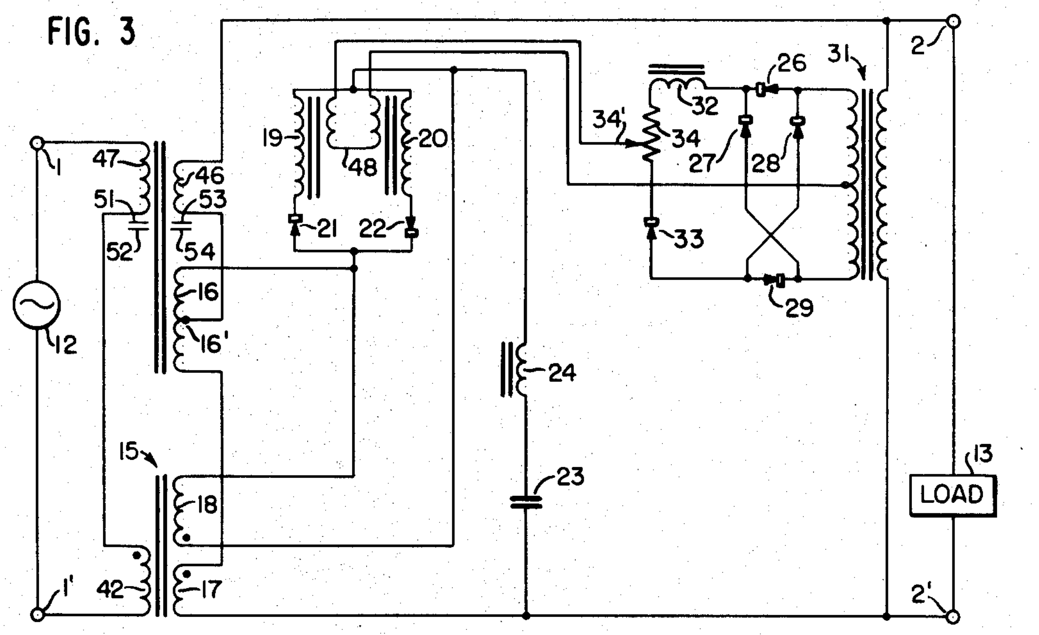
FIG. 3 is an alternative version of the embodiment of FIG. 2.

In FIG. 3 there is illustrated a modified version of the circuit of FIG. 2 which ordinarily lends itself to a more economical type of core construction for the combination of the linear reactor and the saturating autotransformer. Also special laminations can be used in this construction which help to hold to an insignificant value, stray fields that are produced in the vicinity of the regulator. In FIG. 3, a single core assembly used in association with the winding 16 and the winding 46. Also the coupling winding 41 and the reactor winding 43 in FIG. 2 are replaced by a single winding 47. A leakage path, as indicated by the lines 51–54, is provided for the flux which threads the windings 46 and 47. The resulting high leakage inductance is equivalent to the inductance in FIG. 2 by windings 43 and 46 so that the operation of the circuit is substantially the same as that described in connection with FIG. 2.

Figure 4:
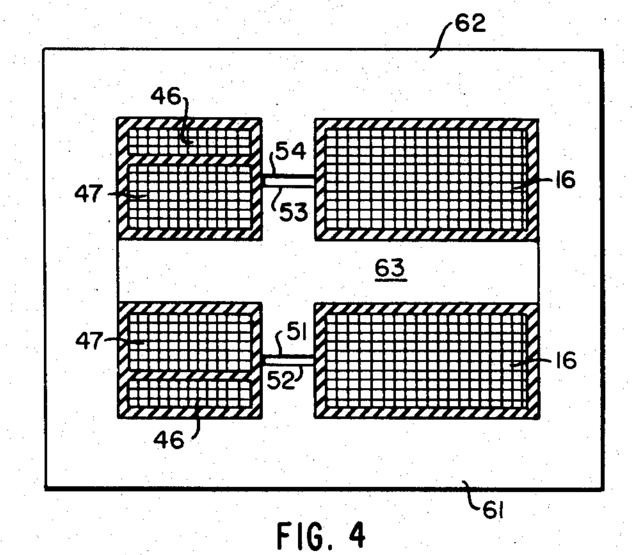
FIG. 4 is a sectional view of the physical construction of one of the cores and its associated windings illustrated schematically in FIG. 3.

The type of core construction contemplated for the embodiment of FIG. 3 is illustrated more in detail in FIG. 4. As shown in FIG. 4, the core has three legs 61–63 with all of the windings 16, 46, 47 on the central leg 63. Winding 46 is concentric about winding 47 at one end of leg 63. Winding 16 is located at the opposite end of leg 63. To accommodate these windings, suitable windows are provided in the laminations which make up the core.

At a location intermediate the windings 47 and 16, the central leg is seen to have a pair of projections or poles 51, 53 extending at right angles to its axes closely adjacent to corresponding inward projections 52 and 54 formed as integral parts of the outer legs 61 and 62. The small air gaps defined by these projections provide the necessary leakage path for the flux threading the windings 46 and 47. Accordingly, it will be observed that the same numerals 51–54 have been used to designate the projections in FIG. 4, as are applied to the lines in FIG. 3 where the gaps are illustrated schematically. In addition to the windings 16, 46, and 47, the core of FIG. 4 can be adapted to accommodate still a fourth winding to take the place of choke 24. For example, the core can be extended toward the right of FIG. 4 and the additional winding provided on the extension of leg 63. Appropriate decoupling of this winding can be obtained by providing adjacent winding 16 low reluctance connections from leg 63 to legs 61 and 62, and by incorporating an air gap between the right hand end of leg 63 and the adjacent end leg of the core which extends between the legs 61 and 62.

It will be appreciated that various other modifications within the spirit and scope of the invention are possible. In particular, a "soft" choke like that disclosed in my aforementioned copending application can also be incorporated in any of the embodiments of the present invention between the cathode anode junction of diodes 21 and 22 and the junction between the common ends of windings 16 and 18. With the addition of this choke, it becomes possible to use a higher gain magnetic amplifier, that is one with a steeper magnetization curve and thereby improve the regulation of the load without increasing harmonic distortion. Those skilled in the art will also recognize that the magnetic amplifier load circuit can optionally be connected in the input circuit of the autotransformer in FIG. 1 and the non-saturating transformer employed to couple the magnetic amplifier load winding circuits into the output circuit of the autotransformer. Similarly in FIGS. 2 and 3 the magnetic amplifier load winding circuits can optionally be connected directly in circuit with the coupling windings and the non-saturating transformer used to couple the magnetic amplifier load windings into the circuits formed with the windings 16 on the output side of the saturating transformer. Various such alternatives and modifications will no doubt occur to those skilled in the art, and therefore the invention should not be deemed to be limited to the details of what has been described herein by way of illustration, but rather it should be deemed to be limited only by the scope of the appended claims.

What is claimed is:

1. Alternating voltage regulating apparatus for converting a source voltage into a relatively stable load voltage, said apparatus comprising a saturating transformer with at least one winding a portion of which is coupled to said load, inductive means to couple said saturating transformer winding to said source, a magnetic amplifier having a pair of load windings and at least one control winding, a pair of oppositely poled rectifying elements connected in circuit with the respective load windings, means to derive a direct voltage from the load voltage, means to apply said direct voltage to said control winding, a capacitor and an inductor connected in series to form a reactive circuit, and a non-saturating transformer having a first winding connected in series with said portion of the saturating transformer winding, and a second winding connected to the magnetic amplifier load winding circuits, said load winding circuits being connected in parallel with one another and in series with said reactive circuit between the remaining portion of the saturating transformer winding and the first winding associated with said non-saturating transformer.

2. Alternating voltage regulating apparatus for converting a source voltage into a relatively stable load voltage, said apparatus comprising a saturating transformer having a primary winding coupled to said source and a secondary winding a portion of which is coupled to said load, a magnetic amplifier having at least one load winding and at least one control winding to vary the impedance of the load winding as a function of the load voltage, a reactive circuit having a capacitive reactance at the source frequency, and a non-saturating transformer having a first winding connected in series with said portion of the saturating transformer secondary winding, a second winding connected to the magnetic amplifier load winding, and a third winding connected in series with the primary winding of the saturating transformer, said load winding and said reactive circuit being connected in series between the remaining portion of the saturating transformer secondary winding and the first winding associated with said non-saturating transformer.

3. Apparatus as claimed in claim 2 wherein said reactive circuit comprises an inductor and a capacitor connected in series and tuned to resonate with one another at the third harmonic of the source frequency.

4. Alternating voltage regulating apparatus for converting a source voltage into a relatively stable load voltage, said apparatus comprising a first linear reactor coupled to the source, a saturating transformer having a primary winding connected in series with said first linear reactor, and a secondary winding a portion of which is coupled to the load, a second linear reactor connected in series with the portion of said secondary winding which is coupled to said load, said linear reactors having a common magnetic core, a magnetic amplifier having at least one load winding and at least one control winding to vary the impedance of the load winding as a function of the load voltage, a reactive circuit having a capacitive reactance at the source frequency, and a non-saturating transformer having a first winding connected in series with said portion of the saturating transformer secondary winding, a second winding connected to the magnetic amplifier load winding, and a third winding connected in series with the primary winding of the saturating transformer, said load winding and said reactive circuit being connected in series between the remaining portion of the saturating transformer secondary winding and the first winding associated with said non-saturating transformer.

5. Alternating voltage regulating apparatus for converting a source voltage into a relatively stable load voltage, said apparatus comprising a magnetic core structure having a first portion, a second portion, and a flux leakage path therebetween, a primary winding on said second portion, said primary winding being coupled to said source, a secondary winding on said first portion a portion of said secondary winding being coupled to said load, a compensating winding on said second portion, said compensating winding being connected in series with the portion of said secondary winding which is coupled to said load, a magnetic amplifier having at least one load winding and at least one control winding to vary the impedance of the load winding as a function of the load voltage, a reactive circuit having a capacitive reactance at the source frequency, and a non-saturating transformer having a first winding connected in series with said portion of the secondary winding, a second winding connected to the magnetic amplifier load winding, and a third winding connected in series with said primary winding, said load winding and said reactive circuit being connected in series between the remaining portion of said secondary winding and the first winding associated with said non-saturating transformer.

6. Alternating voltage regulating apparatus for converting a source voltage into a relatively stable load voltage, said apparatus comprising a saturating voltage transforming means, said saturating transforming means having input and output circuits, a first reactive circuit coupling said saturating transforming means input circuit to said source, a magnetic amplifier having at least one load winding and at least one control winding to vary the impedance of the load winding as a function of the load voltage, a non-saturating voltage transforming means having input and output circuits, the non-saturating transforming means input circuit being connected in series with the saturating transforming means output circuit, the output circuit of said non-saturating transforming means being connected to said magnetic amplifier load winding, a second reactive circuit, said load winding and said second reactive circuit being connected in series with the saturating transforming means output circuit and the non-saturating transforming means input circuit.

7. Apparatus as defined in claim 6 wherein said first reactive circuit has a net inductive reactance and said second reactive circuit comprises an inductor and a capacitor connected in series and tuned to resonate with one another at the third harmonic of the source frequency.

8. Alternating voltage regulating apparatus for converting a source voltage into a relatively stable load voltage, said apparatus comprising a saturating autotransformer having a winding with first, second and third terminals, an inductor connected in series with said source, said inductor coupling said second terminal of the autotransformer winding to said source, a magnetic amplifier having at least one load winding and at least one control winding to vary the impedance of the load winding as a function of the load voltage, a reactive circuit having a capacitive reactance at the source frequency, and a non-saturating transformer having first and second windings, said first winding being connected in a series circuit with said second and third terminals of the autotransformer winding, said second winding being coupled to the magnetic amplifier load winding, said load winding and said reactive circuit being connected in series between said first autotransformer terminal and said first winding of the non-saturating transformer.

9. Apparatus as claimed in claim 8 wherein said second reactive circuit comprises an inductor and a capacitor connected in series and tuned to resonate with one another at the third harmonic of the source frequency.

References Cited in the file of this patent

UNITED STATES PATENTS

| | | |
|---|---|---|
| 2,709,779 | Bixby | May 31, 1955 |
| 2,754,473 | Hooper | July 10, 1956 |
| 2,869,069 | Wright | Jan. 13, 1959 |